US012711419B2

(12) United States Patent
Basak et al.

(10) Patent No.: US 12,711,419 B2
(45) Date of Patent: Aug. 18, 2026

(54) METHOD AND SYSTEM FOR IDENTIFYING MISLABELED DATA SAMPLES USING ADVERSARIAL ATTACKS

(71) Applicant: Tata Consultancy Services Limited, Mumbai (IN)

(72) Inventors: Arghya Basak, Pune (IN); Pradeep Rathore, Pune (IN); Sri Harsha Nistala, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 1134 days.

(21) Appl. No.: 17/689,181

(22) Filed: Mar. 8, 2022

(65) Prior Publication Data

US 2022/0335335 A1 Oct. 20, 2022

(30) Foreign Application Priority Data

Mar. 10, 2021 (IN) ............................ 202121010117

(51) Int. Cl.
*G06N 20/00* (2019.01)
*G06F 21/54* (2013.01)

(52) U.S. Cl.
CPC ............ *G06N 20/00* (2019.01); *G06F 21/54* (2013.01); *G06F 2221/033* (2013.01)

(58) Field of Classification Search
CPC .... G06F 18/2148; G06F 18/217; G06F 12/28; G06N 5/02; G06N 3/045
See application file for complete search history.

(56) References Cited

U.S. PATENT DOCUMENTS

2018/0300576 A1 10/2018 Dalyac et al.
2020/0285952 A1* 9/2020 Liu .......................... G06N 3/08
2021/0089866 A1* 3/2021 Kolter .................. G06F 18/295

FOREIGN PATENT DOCUMENTS

WO WO 2019/171120 A1 9/2019

OTHER PUBLICATIONS

Zeng, Xinchuan & Martinez, Tony. (2001). An algorithm for correcting mislabeled data. Intell. Data Anal . . . 5. 491-502. 10.3233/IDA-2001-5605. (Year: 2001).*

* cited by examiner

*Primary Examiner* — Ann J Lo
(74) *Attorney, Agent, or Firm* — Finnegan, Henderson, Farabow, Garrett & Dunner, LLP

(57) ABSTRACT

Mislabeled data when used for various applications such as training of Machine Learning (ML) models, can cause erroneous results. The state-of-the-art systems performs the mislabel identification with low confidence, and some require manual intervention. The disclosure herein generally relates to data processing, and, more particularly, to a method and system for identifying mislabeled samples using adversarial attacks. The mislabeled sample may refer to a) a data sample that is tagged with a wrong/incorrect label, or b) a distorted/confusing data sample having similarity with multiple classes. The system performs adversarial attack on training data using varying values of adversarial perturbations, and then identifies, for each of the misguided data samples, least value of adversarial perturbation that was required to misguide each of the data samples. Further, the data samples which were misguided by small values of adversarial perturbation, are identified as candidate mislabeled data samples.

6 Claims, 9 Drawing Sheets

| 0.05 | 0.03 | 0.02 | 0.01 | 0.09 | 0.25 | 0.2 | 0.1 | 0.15 | 0.1 |
|---|---|---|---|---|---|---|---|---|---|
| 0 | 1 | 2 | 3 | 4 | 5 | 6 | 7 | 8 | 9 |

Table. 1

Here, tagged label is 8 (Highlighted in the box).

| 0.05 | 0.03 | 0.02 | 0.01 | 0.09 | 0.25 | 0.2 | 0.1 | 0.15 | 0.1 |
|---|---|---|---|---|---|---|---|---|---|
| 0 | 1 | 2 | 3 | 4 | 5 | 6 | 7 | 8 | 9 |

Table. 2

True label is 6 (Highlighted in the box).

| 0.05 | 0.03 | 0.02 | 0.01 | 0.09 | 0.25 | 0.2 | 0.1 | 0.15 | 0.1 |
|---|---|---|---|---|---|---|---|---|---|
| 0 | 1 | 2 | 3 | 4 | 5 | 6 | 7 | 8 | 9 |

Table. 3

Predicted label is 5 (Highlighted in the box).

| 0.20 | 0.22 | 0.23 | 0.24 | 0.16 | NA | 0.05 | 0.15 | 0.10 | 0.15 |
|---|---|---|---|---|---|---|---|---|---|
| 0 | 1 | 2 | 3 | 4 | 5 | 6 | 7 | 8 | 9 |

Table. 4

FIG. 7

METHOD AND SYSTEM FOR IDENTIFYING MISLABELED DATA SAMPLES USING ADVERSARIAL ATTACKS

PRIORITY CLAIM

This U.S. patent application claims priority under 35 U.S.C. § 119 to: Indian Patent Application number 202121010117, filed on Mar. 10, 2021. The entire contents of the aforementioned application are incorporated herein by reference.

TECHNICAL FIELD

The disclosure herein generally relates to data processing, and, more particularly, to a method and system for identifying mislabeled data samples using adversarial attacks.

BACKGROUND

Data labeling is a process of associating meaningful and informative labels with raw data. This is particularly useful in applications/fields such as but not limited to Machine Learning. In ML, the system needs to be trained using training data, so that the system learns to recognize and perform various activities. Labeling of data allows the system to learn and identify what is what, and in turn learn. Accuracy with which an ML model can generate predictions depends largely on accuracy of labels in the training data. However, the training data may contain mislabeled data as well. Such mislabeled data causes the system to incorrectly learn things, and in turn make incorrect predictions. This could be fatal in some applications, for example, in health-care industry.

Existing systems/methods used for mislabel identification have the disadvantage that the confidence with which the mislabel data identification is done is low. For example, annotation verification is an approach traditionally being used for mislabel identification. However, disadvantage of this approach is that it requires manual efforts to perform the verification, and may be a very costly and time-consuming process as expert annotators have to revisit large amount of data, sometimes millions of samples.

SUMMARY

Embodiments of the present disclosure present technological improvements as solutions to one or more of the above-mentioned technical problems recognized by the inventors in conventional systems. For example, in one embodiment, a processor implemented method of identifying mislabeled data samples is provided. In this method, initially training data containing mislabeled data samples and correctly labelled data samples is collected. Further, a data-driven model is trained using the training data, via the one or more hardware processors. Further, logit or probability scores corresponding to a plurality of data samples in the training data are computed using trained data-driven model, via the one or more hardware processors. Further, an adversarial attack is performed on each of the plurality of data samples in the training data, via the one or more hardware processors. Performing the adversarial attack involved the following steps: Initially, all data samples from among the plurality of data samples, that have been misguided by the adversarial attack, are identified. Further, for each of the plurality of data samples, least value of adversarial perturbation is identified from among a plurality of values of adversarial perturbations used for performing the adversarial attack on each of the plurality of data samples, in terms of a predefined metric representing the strength of adversarial attack. The data samples misguided by the adversarial attack are then sorted in ascending order of values of the predefined metric. After performing the adversarial attack, the system generates recommendation of candidate mislabeled data samples from among the plurality of data samples, via the one or more hardware processors, wherein data samples for which the value of predefined metric is below a predefined threshold are identified as the candidate mislabeled data samples.

In another aspect, a system of identifying mislabeled data samples. The system includes one or more hardware processors, a communication interface, and a memory storing a plurality of instructions. The plurality of instructions when executed, cause the one or more hardware processors to initially collect training data containing mislabeled data samples and correctly labelled data samples. Further, a data-driven model is trained using the training data, via the one or more hardware processors. Further, logit or probability scores corresponding to a plurality of data samples in the training data are computed using trained data-driven model, via the one or more hardware processors. Further, an adversarial attack is performed on each of the plurality of data samples in the training data, via the one or more hardware processors. Performing the adversarial attack involved the following steps: Initially, all data samples from among the plurality of data samples, that have been misguided by the adversarial attack, are identified. Further, for each of the plurality of data samples, least value of adversarial perturbation is identified from among a plurality of values of adversarial perturbations used for performing the adversarial attack on each of the plurality of data samples, in terms of a predefined metric representing the strength of adversarial attack. The data samples misguided by the adversarial attack are then sorted in ascending order of values of the predefined metric. After performing the adversarial attack, the system generates recommendation of candidate mislabeled data samples from among the plurality of data samples, via the one or more hardware processors, wherein data samples for which the value of predefined metric is below a predefined threshold are identified as the candidate mislabeled data samples.

In yet another aspect, a non-transitory computer readable medium for identifying mislabeled data samples is provided. The non-transitory computer readable medium contains a plurality of instructions, which when executed, cause one or more hardware processors to perform the identification of the mislabeled samples using the steps below. Initially training data containing mislabeled data samples and correctly labelled data samples is collected. Further, a data-driven model is trained using the training data, via the one or more hardware processors. Further, logit or probability scores corresponding to a plurality of data samples in the training data are computed using trained data-driven model, via the one or more hardware processors. Further, an adversarial attack is performed on each of the plurality of data samples in the training data, via the one or more hardware processors. Performing the adversarial attack involved the following steps: Initially, all data samples from among the plurality of data samples, that have been misguided by the adversarial attack, are identified. Further, for each of the plurality of data samples, least value of adversarial perturbation is identified from among a plurality of values of adversarial perturbations used for performing the adversarial attack on each of the plurality of data samples, in terms of a predefined metric representing the strength of adversarial attack. The data samples misguided by the adversarial attack are then sorted in ascending order of values of the predefined metric. After performing the adversarial attack, the system generates recommendation of candidate mislabeled data samples from among the plurality of data samples, via the one or more hardware processors, wherein data samples for which the value of predefined metric is below a predefined threshold are identified as the candidate mislabeled data samples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 7 illustrates candidate mislabeled data samples sorted and tagged label compared with true label and predicted label to arrange the misguided samples in ascending order of minimum value corresponding to each of the misguided samples, according to some embodiments of the present disclosure.

DETAILED DESCRIPTION

Figure 1:
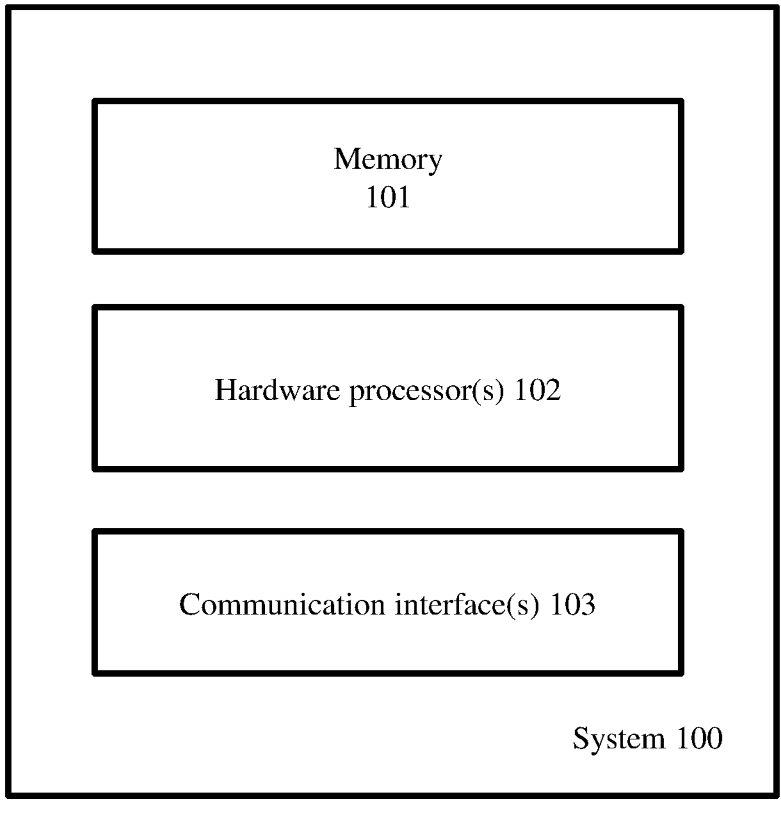
FIG. 1 illustrates an exemplary system for mislabel identification, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

FIG. 1 illustrates an exemplary system for mislabel identification, according to some embodiments of the present disclosure. Step of identifying mislabeled data samples using adversarial attacks is termed as mislabel identification. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

Figure 6A:
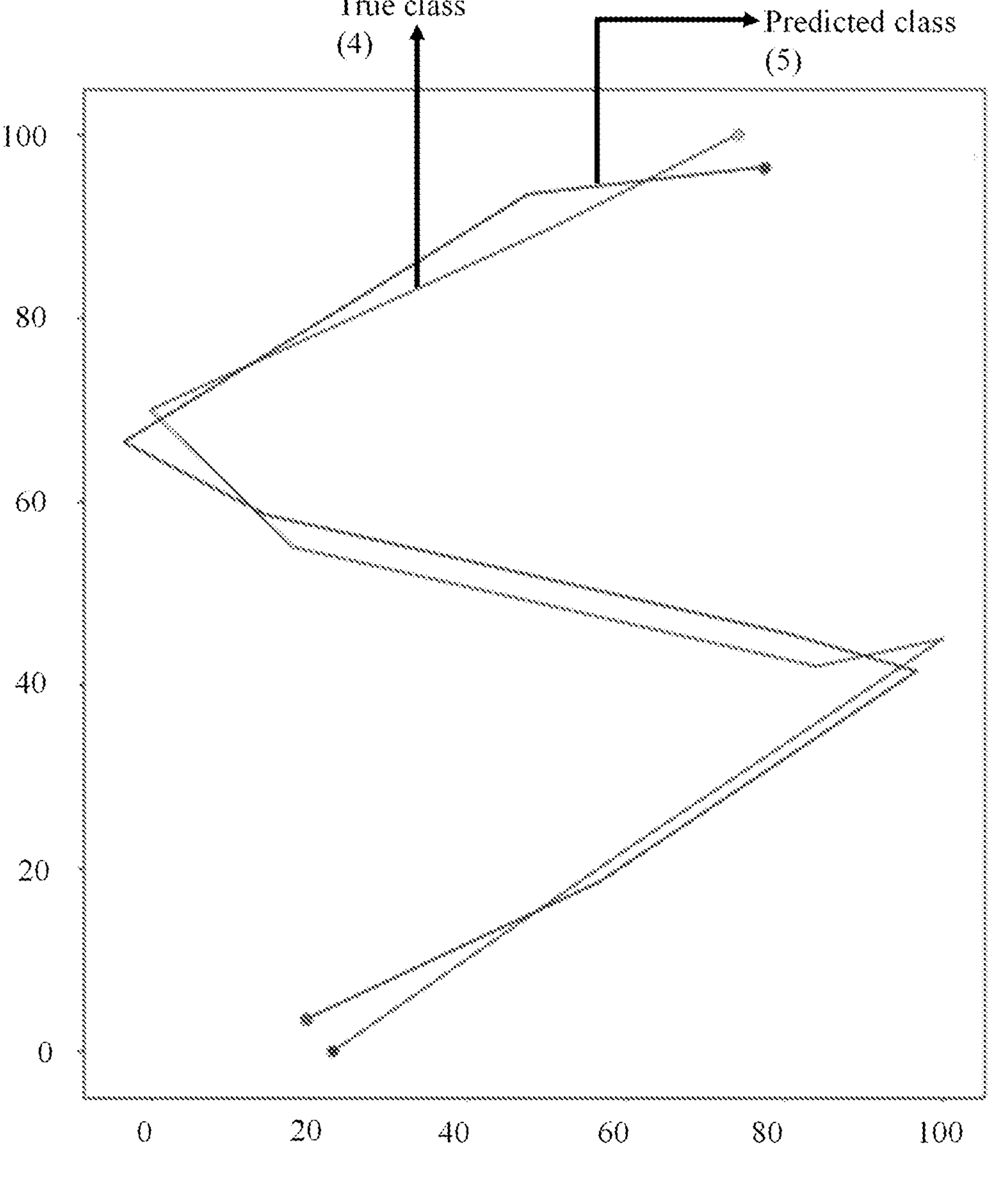
FIGS. 6A and 6B are example diagrams illustrating data samples that have been misguided while an adversarial perturbation was applied, according to some embodiments of the present disclosure.
Figure 6B:
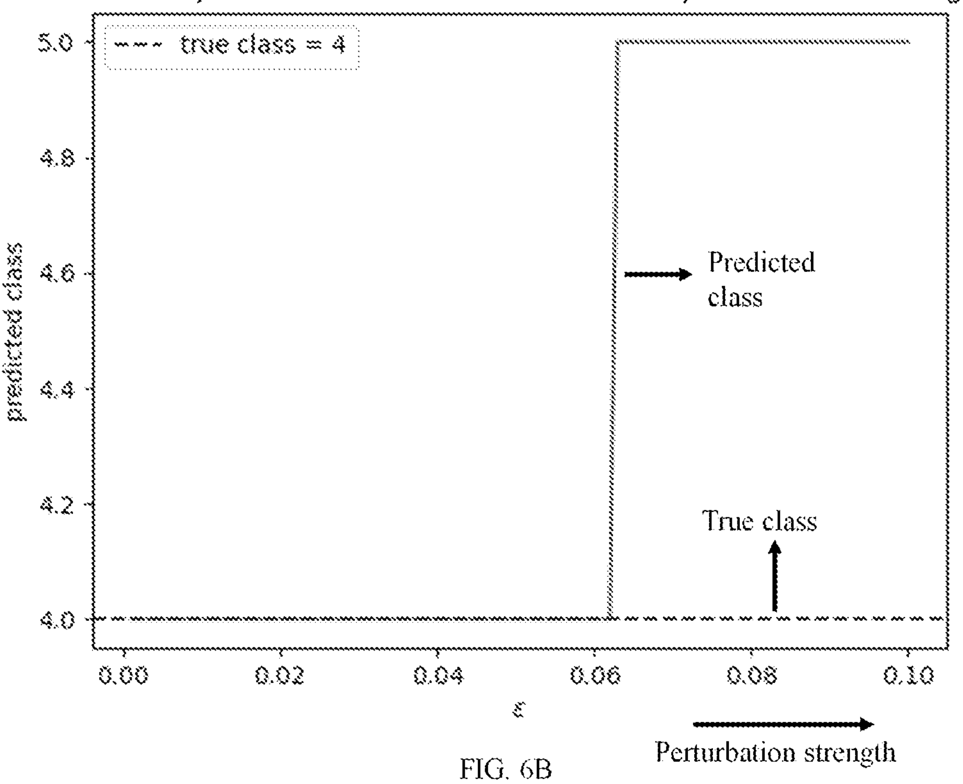

The memory 101 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of mislabel identification being performed by the system 100. The mislabeled sample may refer to a) a data sample that is tagged with a wrong/incorrect label, or b) a distorted/confusing data sample having similarity with multiple classes. For example, consider FIG. 6A. In FIG. 6A, even though the true class (alternately referred to as 'true value') of the data sample is 4, the way 4 is written may cause confusion and prompt a system or a person performing the labeling to believe that the data sample corresponds to class 5 (instead of 4, which is the true class). This confusion thus causes mislabeling/incorrect labeling, and hence predicted class (alternately referred to as predicted value) is 5, which is different from the true class. The mislabeling or incorrect labeling may also be due to a human error or system error even though the data sample may not be distorted/confusing. The system 100 can be implemented in a variety of ways as per requirements. Various steps involved in the process of mislabel identification being performed by the system 100 of FIG. 1 are depicted in FIG. 2 and FIG. 3, and are explained with reference to the hardware components depicted in FIG. 1.

Figure 2:
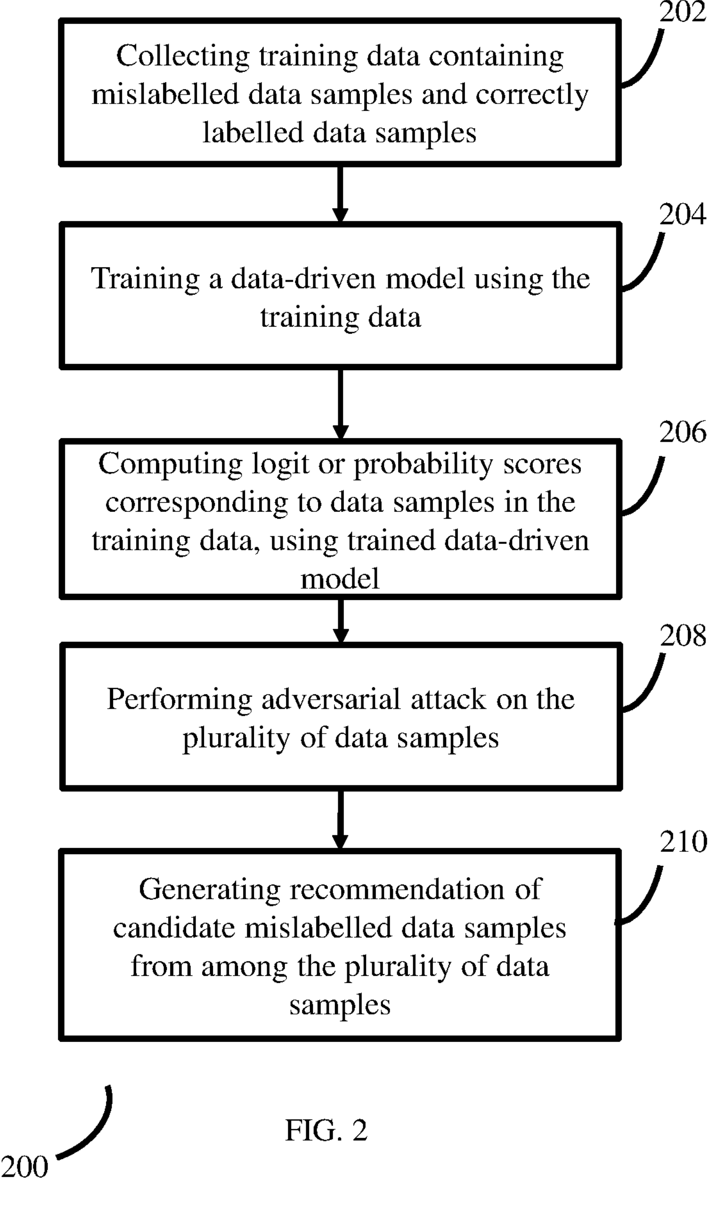
FIG. 2 is a flow diagram depicting steps involved in the method of mislabel identification, by the system of FIG. 1, according to some embodiments of the present disclosure.
Figure 3:
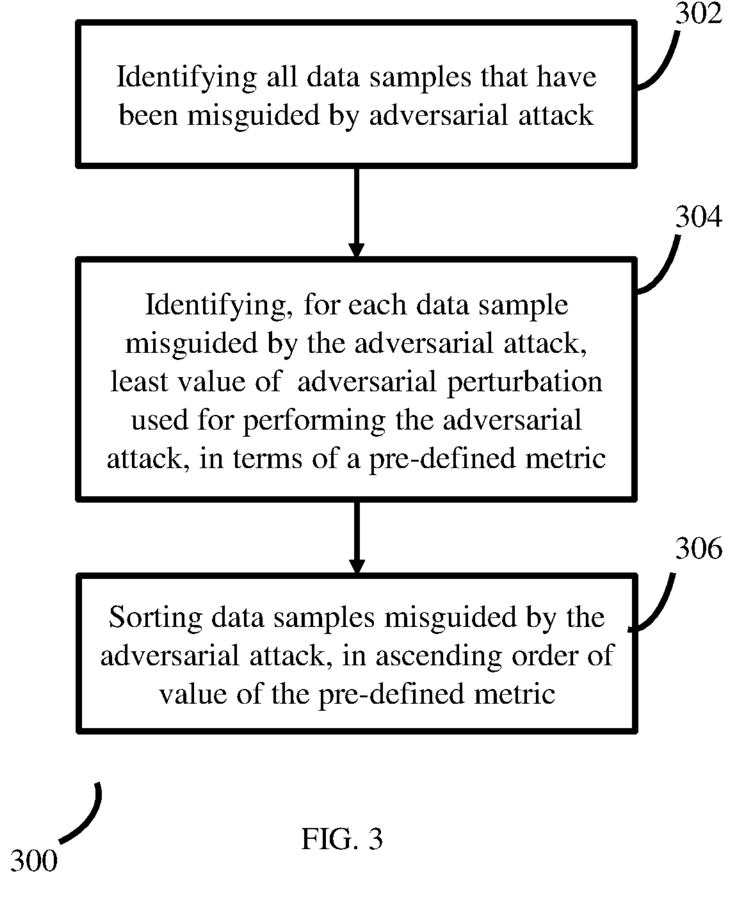
FIG. 3 is a flow diagram depicting steps involved in the process of performing adversarial attack on training data for mislabel identification, by the system of FIG. 1, in accordance with some embodiments of the present disclosure.
Figure 4:
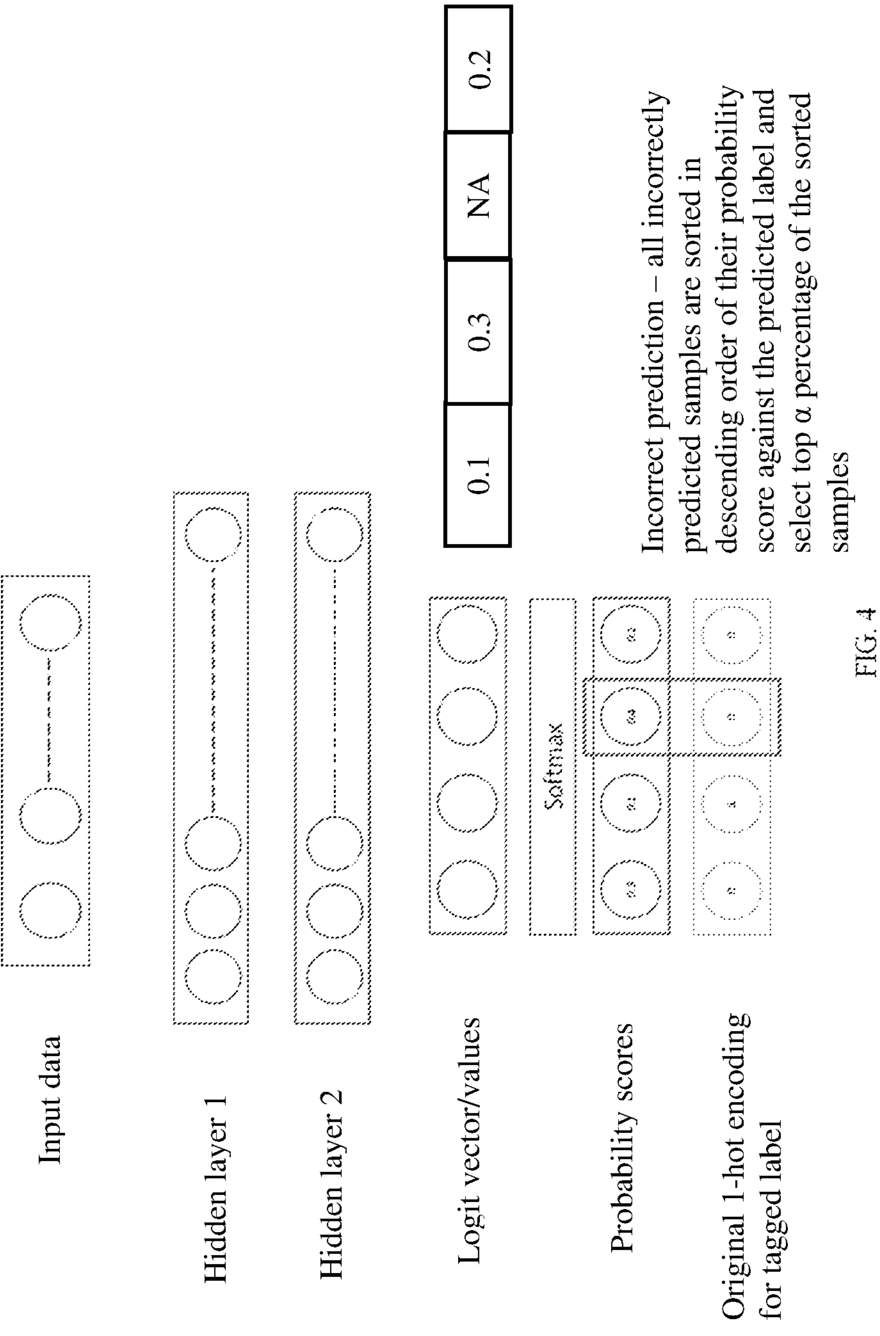
FIG. 4 is an exemplary diagram illustrating steps in a method of mislabel identification by the system of FIG. 1, according to some embodiments of the present disclosure.

FIG. 2 is a flow diagram depicting steps involved in the method of mislabel identification, by the system of FIG. 1, according to some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202, the system 100 collects training data. The training data contains mislabeled data samples and correctly labelled data samples, wherein the labeling may have been done by a human or by a system. The data samples may be real-time data from data sources such as but not limited to industrial plants, and/or may be artificially generated using suitable means such as but not limited to soft-sensors and laboratory experiments. In an embodiment, the collected training data may be pre-processed using suitable data processing mechanisms to format the data as required for further processing. For example, the real-time data from industrial plant (or any such source) may contain noise data, and data from different components of the industrial plant may be in different formats. During the pre-processing, the noise data may be removed, and the data from different components may be transformed/converted to a standard format that can be further processed by the system 100.

Further at step 204, the system 100 trains a data-driven model using the training data collected (and pre-processed) at step 202. The system 100 may use any known and suitable machine learning technique to train the data-driven model using the training data. Further at step 206, the system 100 computes logit or probability score corresponding to each of a plurality of data samples in the training data, using the data-driven model trained at step 204.

Further, at step 208, the system 100 performs adversarial attack on the plurality of data samples. The term 'adversarial attack' in this context refers to standard adversarial attack in the field of machine learning, which is an approach used to obtain wrong result from a machine learning or data-driven model, by designing input in a specific way. Also, in this context, 'performing the adversarial attack' involves the steps depicted in flow diagram 300 of FIG. 3, and are explained hereafter.

Figure 5A:
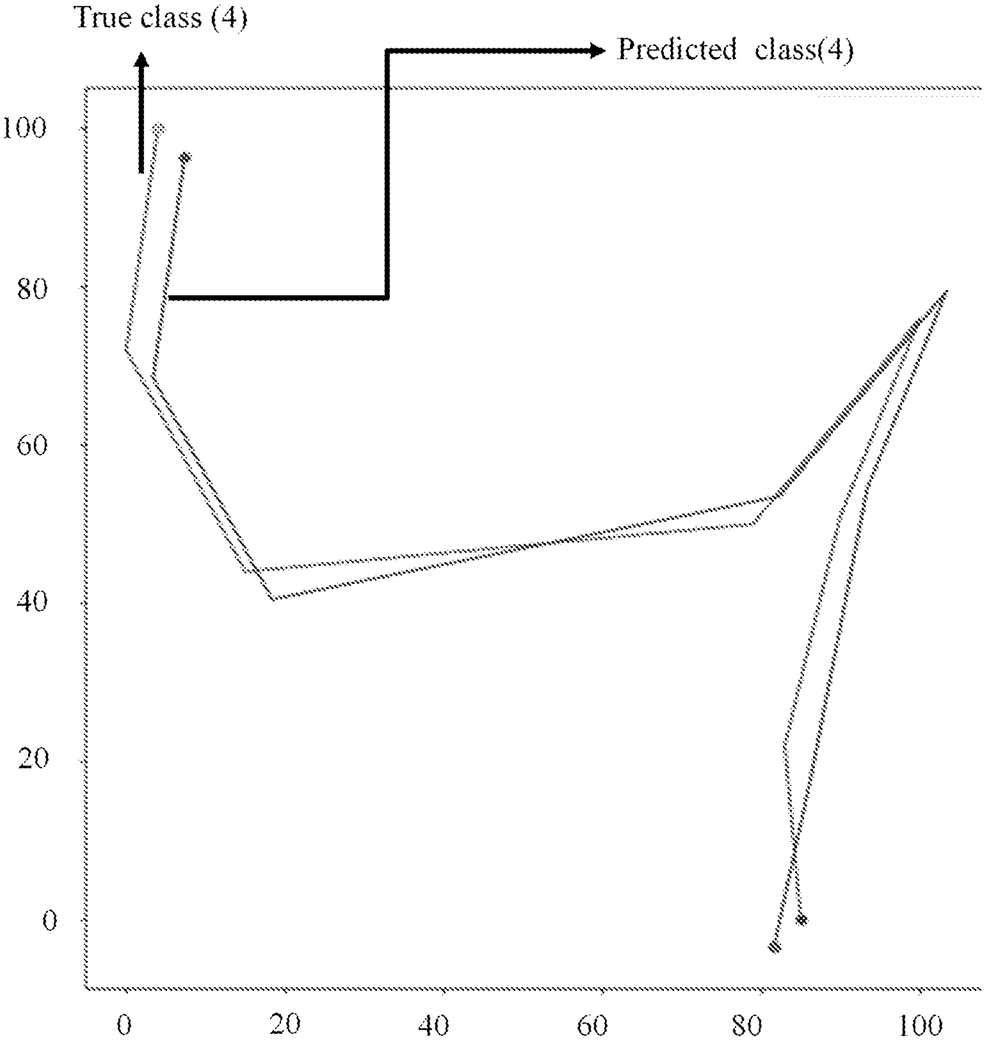
FIGS. 5A and 5B are example diagrams illustrating data samples that are not misguided for varying values of adversarial perturbation, according to some embodiments of the present disclosure.
Figure 5B:
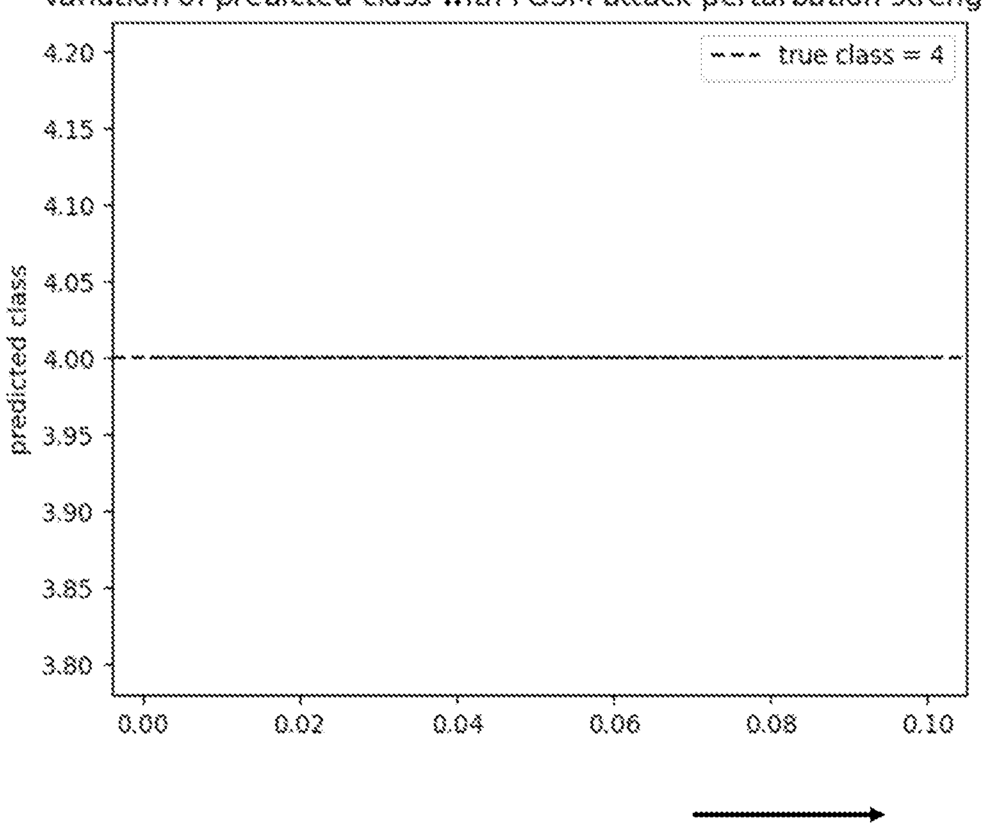

The system 100 performs the adversarial attack on each of the data samples, using varying values of adversarial perturbations. After performing the adversarial attack, at step 302, the system 100 identifies all data samples that have been misguided by the adversarial attack, from among the plurality of data samples in the training data. In various embodiments, from among the plurality of data samples, some of the data samples may be misguided by the adversarial attack and some other data samples may not be misguided by the adversarial attack. An example of data sample that is not misguided by the adversarial attack is depicted in FIG. 5A. As depicted in FIG. 5A, the predicted class (i.e. 4) is same as the true class 4. This is further depicted in FIG. 5B. As in FIG. 5B, the predicted value and the true value are the same for varying values of perturbation applied. Similarly, an example of data sample that has been misguided by the adversarial attack is depicted in FIG. 6A. As depicted in FIG. 6A, the predicted class is 5, whereas the true value 4. This is further depicted in FIG. 6B. As in FIG. 6B, for smaller values of perturbation, the predicted value and the true value remained the same. However, as the value of perturbation exceeded a particular point (i.e. a value just above 0.06), the data sample was misguided and the predicted class became 5 (instead of 4). Further, at step 304, the system 100 identifies, for each of the data samples identified as misguided by the adversarial attack, least value of adversarial perturbation used for performing the adversarial attack, from among a plurality of different values of adversarial perturbations used for performing the adversarial attack, based on data in a predefined metric representing the strength of adversarial attack. In various embodiments, the least value of adversarial perturbations is identified in terms of values of one or more pre-defined metric. A few examples of parameters that can form the metric are, but not limited to, Dynamic Time Warping Distance for time series data, perceptual loss for image and video data, and Euclidean distance for tabular data. The predefined metric is computed using an original data sample and corresponding adversarial data sample, for each of the data samples identified as misguided by the adversarial attack. Further, at step 306, the system 100 sorts the data samples that have been identified as misguided by the adversarial attack, in ascending order of value of the pre-defined metric considered. In an alternate embodiment, the data samples may be sorted in descending order of value of the pre-defined metric.

Further, at step 210, the system 100 generates recommendations of candidate mislabeled data samples from the sorted data samples. In an embodiment, the system 100 is configured to consider that if a data sample has been misguided by a small/low value of the adversarial perturbation, then that data sample is a potential candidate to be one of the mislabeled data samples. In this context, the 'small/low value' of the adversarial perturbation is defined/determined by comparing values of adversarial perturbations used for performing the adversarial attack on the plurality of data samples. In another embodiment, the values of adversarial perturbations used for performing the adversarial attack on the plurality of data samples are compared with a threshold of perturbation, and all the values of adversarial perturbations below the threshold of perturbation are considered to be 'small/low value' of the adversarial perturbation.

In various embodiments, one or more steps in the method 200 may be performed in the same order as depicted in FIG. 2, or in any alternate order that is technically feasible. In another embodiment, one or more steps in method the 200 may be omitted.

In an alternate approach that may be used by the system 100 for identifying the mislabeled data samples, the system 100 trains the data-driven model using the training data containing the mislabeled data samples and the correctly labeled data samples. Then the trained data-driven model is used to get the logit/probability scores on the training data. The system 100 then checks, for each of the data samples, whether tagged label and predicted label are same or different. If the tagged label and the predicted label are same, then the system 100 sorts the data samples in ascending order of probability score corresponding to their tagged labels. From the sorted data samples, 'top n percentage' data samples are selected as the candidate mislabeled data samples. If the tagged label and the predicted label are not same, then the system 100 sorts the data samples in descending order of probability score corresponding to their predicted labels. Further, from the sorted data samples, 'top m percentage' data samples are selected as the candidate mislabeled data samples.

In a second alternate approach for identifying the mislabeled data samples, the system 100 introduces fake data samples in the training data. For example, let X be a set of unmodified training data samples, such that $x^i$ represents $i^{th}$ data sample from X. Let F is a set of fake samples which have been intentionally mislabeled, such that $f^j \in F$ is $j^{th}$ sample from F, and K represents number of possible classes. The fake samples are added to the unmodified training data. For explanation purpose, the training data containing the fake samples is termed as 'modified training data'. The system 100 then trains the data-driven model using the modified training data. The system 100 then chooses a threshold of absolute difference of probability scores/logits corresponding to the tagged labels and the predicted labels of the fake samples. The system 100 then uses the trained data-driven model to determine the logit/probability scores on the unmodified training data. For example, the system 100 calculates the logit and probability scores as:

$$\text{logit}(f^j, k) = \text{logit value for } j^{th} \text{ fake sample } f^j \text{ for class } k, \quad \text{where } k \in \{1, 2, \ldots K\}$$

$$prob(x^i, k) = \text{probability score for unmodified sample } x^i \text{ corresponding to class } k$$

Further, either the logit values or the probability scores are used for further calculations. However, as the process or logic is the same, a parameter LP is used to commonly represent both the logit value and the probability score. At any instance, LP may represent either the logit value or the probability score.

Further the system 100 for each of the sample $x^i$ computes a maximum value of the logit/probability scores, and determines absolute differences between the computed maximum value of the logit/probability scores and the remaining values of the logit/probability scores corresponding to the sample. The system 100 determines value of a threshold (t) as:

$$\tau = \text{predefined percentile value of } |LP(f^i, \text{true label}) - LP(f^i, \text{tagged label})|$$

For each of the sample $x^i$ in X a label corresponding to maximum logit/probability score value from among a plurality of values is determined as:

$$m^i = \underset{j}{\text{argmax}} LP(x^i, j)$$

Further, for the sample $x^i$ for each label k other than $m^i$, the system 100 computes the absolute difference between the logit/probability scores corresponding to k and $m^i$ as follows:

$$\delta_k^i = |LP(x^i, m^i) - LP(x^i, k)| \text{ for } k \neq m^i$$

The data samples having one or more δs less than the threshold τ, are selected as the candidate mislabeled data samples. The candidate mislabeled samples are sorted in ascending order of minimum δ value corresponding to each of the candidate mislabeled samples. Top few percent of this selected sorted samples are recommended for manual review.

This is further explained referring to the values as given in table 1-4 of FIG. 7:

Difference in comparison with the max value (i.e. 0.25) is calculated at every position except at $m^i$ (i.e. 0.25). Consider that the determined value of threshold (τ) is 0.15. The values that are smaller than the threshold are at labels 6 and 8 (minimum δ value). The system 100 may then arrange the misguided samples in ascending order of minimum value of δ (for example 0.05 for the shown sample) corresponding to each of the misguided samples.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of mislabel identification. The embodiment, thus provides a mechanism for identifying the mislabeled data samples using adversarial attack.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of identifying mislabeled data samples, comprising:

collecting training data, via one or more hardware processors, wherein the training data comprises the mislabeled data samples and correctly labelled data samples, wherein the labeling is done by a human or by a system, wherein the data samples are real-time data from data sources, wherein the data sources comprises industrial plants, and/or artificially generated using soft sensors or laboratory experiments, wherein the mislabeled sample comprises a) a data sample that is tagged with a wrong/incorrect label, or b) a distorted/confusing data sample having similarity with multiple classes;

training a data-driven model using the training data, via the one or more hardware processors;

computing, using trained data-driven model, logit or probability scores corresponding to a plurality of data samples in the training data, via the one or more hardware processors;

performing an adversarial attack on each of the plurality of data samples in the training data, via the one or more hardware processors, wherein the adversarial attack is performed by considering a data label predicted by the data-driven model as a true label of each data sample, wherein the adversarial attack is performed to obtain wrong result from a machine learning model or the data-driven model, by designing an input in a way using varying values of adversarial perturbations, wherein performing the adversarial attack, comprising:

identifying all data samples from among the plurality of data samples, that have been misguided by the adversarial attack;

identifying for each of the data samples that have been misguided by the adversarial attack, least value of adversarial perturbation from among a plurality of values of adversarial perturbations used for performing the adversarial attack on each of the plurality of data samples, in terms of a predefined metric representing strength of the adversarial attack, wherein the predefined metric is computed using an original data sample and corresponding adversarial data sample, for each of the data samples identified as misguided by the adversarial attack; and sorting the data samples that have been misguided by the adversarial attack, in ascending order of values of the predefined metric; and identifying candidate mislabeled data samples from among the plurality of data samples, via the one or more hardware processors, wherein data samples for which the value of predefined metric is below a predefined threshold are identified as the candidate mislabeled data samples, thereby improving accuracy of identification of the mislabel data samples.

2. The method as claimed in claim 1, wherein the predefined metric is dependent on data type and is at least one of Dynamic Time Warping Distance for time series data, perceptual loss for image and video data, and Euclidean distance for tabular data.

3. A system of identifying mislabeled data samples, comprising:

one or more hardware processors;

a communication interface; and a memory storing a plurality of instructions, wherein the plurality of instructions when executed, cause the one or more hardware processors to:

collect training data, wherein the training data comprises the mislabeled data samples and correctly labelled data samples, wherein the labeling is done by a human or by a system, wherein the data samples are real-time data from data sources, wherein the data sources comprises industrial plants, and/or artificially generated using soft sensors or laboratory experiments, wherein the mislabeled sample comprises a) a data sample that is tagged with a wrong/incorrect label, or b) a distorted/confusing data sample having similarity with multiple classes;

train a data-driven model using the training data;

compute, using trained data-driven model, logit or probability scores corresponding to a plurality of data samples in the training data;

perform adversarial attack on each of the plurality of data samples in the training data, wherein the adversarial attack is performed by considering a data label predicted by the data-driven model as a true label of each data sample, wherein the adversarial attack is performed to obtain wrong result from a machine learning model or the data-driven model, by designing an input in a way using varying values of adversarial perturbations, wherein performing the adversarial attack, by:

identifying all data samples from among the plurality of data samples, that have been misguided by the adversarial attack;

identifying for each of the data samples that have been misguided by the adversarial attack, least value of adversarial perturbation from among a plurality of values of adversarial perturbations used for performing the adversarial attack on each of the plurality of data samples, in terms of a predefined metric representing strength of the adversarial attack; and sorting the data samples that have been misguided by the adversarial attack, in ascending order of values of the predefined metric; and identify candidate mislabeled data samples from among the plurality of data samples, wherein data samples for which the value of predefined metric is below a predefined threshold are identified as the candidate mislabeled data samples, thereby improving accuracy of identification of the mislabel data samples.

4. The system as claimed in claim 3, wherein the predefined metric is dependent on data type and is at least one of Dynamic Time Warping Distance for time series data, perceptual loss for image and video data, and Euclidean distance for tabular data.

5. One or more non-transitory machine-readable information storage mediums comprising one or more instructions which when executed by one or more hardware processors cause:

collecting training data, wherein the training data comprises the mislabeled data samples and correctly labelled data samples, wherein the labeling is done by a human or by a system, wherein the data samples are real-time data from data sources, wherein the data sources comprises industrial plants, and/or artificially generated using soft sensors or laboratory experiments, wherein the mislabeled sample comprises a) a data sample that is tagged with a wrong/incorrect label, or b) a distorted/confusing data sample having similarity with multiple classes;

training a data-driven model using the training data;

computing, using trained data-driven model, logit or probability scores corresponding to a plurality of data samples in the training data;

performing an adversarial attack on each of the plurality of data samples in the training data, wherein the adversarial attack is performed by considering a data label predicted by the data-driven model as a true label of each data sample, wherein the adversarial attack is performed to obtain wrong result from a machine learning model or the data-driven model, by designing an input in a way using varying values of adversarial perturbations, wherein performing the adversarial attack comprising:

identifying all data samples from among the plurality of data samples, that have been misguided by the adversarial attack;

identifying for each of the data samples that have been misguided by the adversarial attack, least value of adversarial perturbation from among a plurality of values of adversarial perturbations used for performing the adversarial attack on each of the plurality of data samples, in terms of a predefined metric representing strength of the adversarial attack; and sorting the data samples that have been misguided by the adversarial attack, in ascending order of values of the predefined metric; and identifying candidate mislabeled data samples from among the plurality of data samples, wherein data samples for which the value of predefined metric is below a predefined threshold are identified as the candidate mislabeled data samples, thereby improving accuracy of identification of the mislabel data samples.

6. The one or more non-transitory machine-readable information storage mediums of claim 5, wherein the predefined metric is dependent on data type and is at least one of Dynamic Time Warping Distance for time series data, perceptual loss for image and video data, and Euclidean distance for tabular data.

* * * * *